US005904190A

United States Patent [19]

Patel

[11] Patent Number: 5,904,190

[45] Date of Patent: May 18, 1999

[54] METHOD TO PREVENT EXPLOSIONS IN FUEL TANKS

[75] Inventor: C. Kumar Patel, Los Angeles, Calif.

[73] Assignee: The Regents of the University of California, Oakland, Calif.

[21] Appl. No.: 08/877,263

[22] Filed: Jun. 17, 1997

[51] Int. Cl.[6] .................................................... B64D 37/32

[52] U.S. Cl. ............................ 141/198; 141/95; 169/66; 169/45

[58] Field of Search .................................... 141/192, 198, 141/4, 40, 52, 65, 95; 169/66, 45

[56] References Cited

U.S. PATENT DOCUMENTS

| | | |
|---|---|---|
| 3,830,307 | 8/1974 | Bragg et al. . |
| 4,378,920 | 4/1983 | Rummels et al. . |
| 4,834,187 | 5/1989 | Bragg . |
| 4,915,127 | 4/1990 | Werley .............................. 137/505.42 |
| 5,224,550 | 7/1993 | Bragg . |
| 5,425,886 | 6/1995 | Smith . |
| 5,562,162 | 10/1996 | Webb ....................................... 169/45 |

*Primary Examiner*—Steven O. Douglas

*Attorney, Agent, or Firm*—Loeb & Loeb LLP; Michael J. Ram

[57] ABSTRACT

A method for preventing explosions in closed tanks which hold flammable liquids and flammable vapors and air above these liquid fuels comprising filling the ullage with a pressurized gas which not only excludes oxygen from the ullage but also prevents transmission of fire initiating sparks. The method further comprises filling the ullage with an electronegative gas alone or in combination with an inert gas or gases. More specifically, the preferred electronegative gas is sulfur hexafluoride ($SF_6$) which may also be used in combination with $CO_2$ and/or $N_2$. More particularly, the method is directed to the prevention of explosions in aircraft fuel tanks.

11 Claims, 1 Drawing Sheet

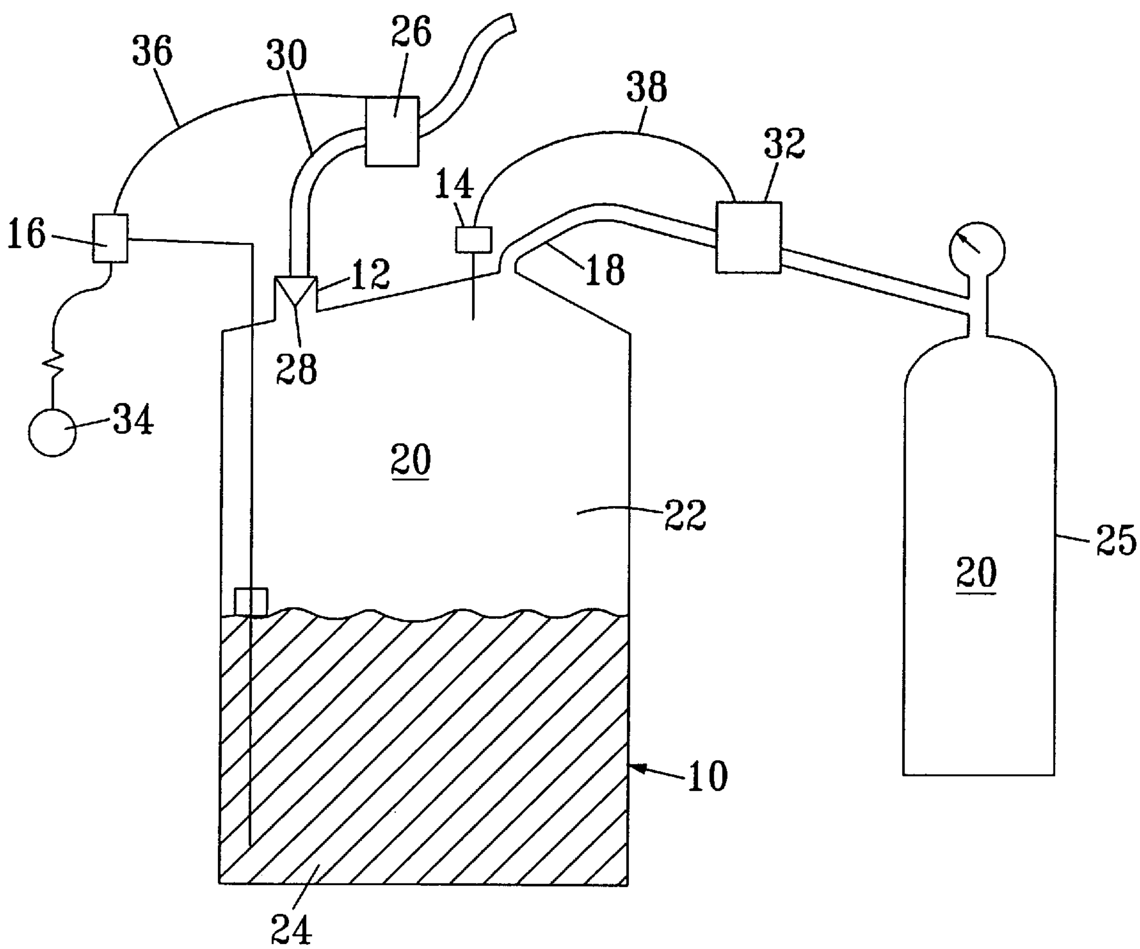
36
30
26
38
32
14
16
12
18
28
34
20
22
25
20
10
24

METHOD TO PREVENT EXPLOSIONS IN FUEL TANKS

BACKGROUND

The present invention relates to a method to prevent explosions in closed tanks which hold flammable liquids and flammable vapors and air above these liquid fuels. More particularly, the invention is directed to the prevention of explosions in aircraft fuel tanks.

Because of recent unexplained aircraft explosions, there has been a renewed interest in controlling fires aboard aircraft. One particular possible source of aircraft fires, and particularly explosions, is the fuel tanks on the airplane. Under normal operating conditions there exists an explosive mixture of vaporized fuel or fuel components and air in the space above the liquid fuel, referred to as the ullage. If this mixture is exposed to a flame source, such as a spark, the vapors can ignite in an explosive manner, causing a rupture of the tank, rapid expansion, vaporization and ignition of the liquid fuel and a destruction of the aircraft. Current aircraft fire prevention techniques consists primarily of the release of flame retardants such as halogenated hydrocarbons, including $CCl_4$, $CF_4$, FREONS, or HALONS (broadly referred to as chloro-fluorohydrocarbons), following flame ignition. In most cases, particularly in the case of a fuel tank ignition, this response is too late as the ignition rapidly evolves into an explosion.

Thus there is a need to prevent ignition of the fuel vapors rather than extinguishing them after they are ignited.

SUMMARY

These needs are met by the present invention which comprises filling the ullage with a pressurized gas which not only excludes oxygen from the ullage but also prevents transmission of fire initiating sparks. The invention further comprises filling the ullage with an electronegative gas alone or in combination with an inert gas or gases. More specifically, the preferred electronegative gas is sulfur hexafluoride ($SF_6$) which may also be used in combination with $CO_2$ and/or $N_2$.

In order for current aircraft fuel tanks to properly function and make fuel available to the engine in a controlled volume, as the fuel is consumed the space above the fuel is filled with air. As the elevation of the airplane above sea level is increased and the ambient air pressure decreases the pressure of this air over the fuel is maintained at sea level atmospheric pressure (14.696 psi), or some other preselected pressure greater then atmospheric pressure in order to maintain a continuous feed rate. Therefore, the ullage air is compressed to maintain a continuous, controlled fuel flow. It now appears that one of the causes of fuel tank explosions may be the malfunctioning of various sensors within the tank, such as pressure or volume sensors, or the air compressor, causing an electrical short circuit and a spark, or the generation of static electricity as very low humidity compressed air flows in and out of the tank or around the aircraft.

In order for such a system to maintain its explosion proof character it must be a closed system which, when empty, contains only the inert atmosphere, as the fuel is fed to or extracted from the tank no air is allowed to enter the tank, and the inert atmosphere is transferred to a holding tank on the air craft where it is pressurized and stored for reintroduction into the ullage as the fuel is depleted.

DRAWINGS

These and other features, aspects and advantages of the present invention will become better understood with reference to the following description, appended claims, and accompanying drawing, where:

FIG. 1 is a schematic drawing showing a system embodying features of the invention

DESCRIPTION

FIG. 1 is a schematic diagram showing an aircraft fuel tank and ullage gas supply system which incorporates features of the invention. The tank 10 is of size and construction of currently used aircraft fuel tanks. It includes a fuel filling spout 12, a pressure sensor 14 and a fuel level sensor 16. Connected to the tank is a gas exit line 18 for movement of a pressurized gas 20 to and from the space (ullage) 22 above the fuel 24 or, alternatively, into a storage tank 25. However, rather than supplying compressed air to the ullage 22, according to the teachings of the invention as further discussed below, the gas is inert and all reasonable efforts are exerted to not allow oxygen into such gas or, if oxygen does enter said gas, to remove such oxygen.

The fuel level sensor 16 may be used only to indicate the fuel level in the tank on a remote gauge 34 or additionally be electrically connected, by a transmission line 36 to the fuel pump 26 so that transfer of fuel into the tank is discontinued when the desired fuel volume in the tank 10 is reached. The filling spout 12 includes therein a hermetic seal 28 to prevent air from entering the tank 10 when the filling hose 30 is inserted into the filling spout 12 or to prevent the inert gas 20 in the tank 10 from escaping as the fuel is pumped into the tank 10. Also connected to the top of the tank 10 is an inert gas exit line 18 and a pressure sensor 14. Located between the fuel tank 10 and the gas storage tank 25, operatively connected to move or control movement of the gas 20 back and forth, is a transfer pump 32. FIG. 1 shows a single exit line 18 and a single transfer pump 32 with the pump 32 being capable of moving the gas in either direction. However, the same function can be provided by an exit line 18 and exhaust pump 32 and a separate fill line and fill pump and/or one way valves which operate at preset pressures (not shown), both of which are operatively connected to the pressure sensor 14 by a control line 38 and programmed to move the gas 20 back and forth between the fuel tank 10 and the gas tank 20 to maintain a preselected pressure or pressure range in the fuel tank 10.

In order to use the system incorporating the invention described above and shown in FIG. 1 the tank is emptied of its gaseous contents to eliminate the presence of oxygen and then filled with the inert gas 20, One technique is to totally fill the tank 10 with a liquid which fills the entire inner space and then replace the liquid with the inert gas. This is aided by placing the inert gas exit line 18 at the highest point in the tank 10. Once the tank 10 is filled with the inert gas, care must be taken to prevent oxygen from entering the tank. As the tank 10 is filled with liquid fuel 24, because the tank does not have pressure relief vents, the inert gas 20 would become pressurized if not removed from the tank 10. Once the pressure in the tank 10, as determined by gas sensor 14, reaches the preset pressure, pump or one way valve 32 activates or opens and the inert gas 20 is transferred to the gas tank 25 where it is held at an elevated pressure until later needed. Once the desired amount of fuel 24 has been transferred into fuel tank 10 the filling hose 30 is removed and the filling spout 12 is sealed.

The fire safe system is now ready for use. As the fuel 24 in the tank is consumed the size of the ullage 22 increases. The pressure in the ullage is maintained at the preset level by pressurized inert gas 20 being fed into the fuel tank 10.

This arrangement allows for safe, explosion-proof use of highly flammable fuels with high vapor pressures, without fear of a vaporized fuel/air mixture igniting as a result of an inadvertent spark from electrical components in the system or static electricity generated by operation of the fuel system.

While it may be adequate to fill the ullage 22 with a non-flammable gas such as nitrogen or carbon-dioxide it has been found that if that inert gas is further supplemented by the addition of an electronegative gas, such as sulfur hexafluoride ($SF_6$), the possibility of an electric spark propagation, flame ignition and a subsequent explosion is significantly reduced or eliminated. A suitable inert gas mixture includes 1–10% sulfur hexafluoride ($SF_6$). Higher amounts of $SF_6$ can further reduce the explosion hazard but may not be necessary.

Further contemplated by the invention is the use of 100% $SF_6$ or other inert gases other than $N_2$ or $CO_2$ along with that compound.

Although the present invention has been described in considerable detail with reference to certain preferred versions and uses thereof, other versions and uses are possible. For example, other inert gases, such as FREONS, $CCl_4$, or HALONS (chloro-fluorohydrocarbons) can be used with the $SF_6$. Additionally, oxygen adsorbents or reactants can be added to the space above the fuel in the tank or incorporated in the inert gas supply, storage or transfer system so that any oxygen entering the system can be removed or bound so it is not available for combustion. Also there is no intention to limit the type of fuel of pressure sensors, which may be electrical, mechanical, or electromechanical, or the construction of the pumps which may be of an explosion proof nature. Therefore, the spirit and scope of the appended claims should not be limited to the description of the preferred versions contained herein.

What is claimed is:

1. An explosion proof fuel containment system for storing fuel under a blanket of inert gas comprising a fuel tank having a fuel filling spout and an inert gas exit line connected thereto and a pressure sensor and a fuel level sensor mounted therein, a. the fuel level sensor functioning to indicate the fuel level in the tank and to send controlling information to a fuel pump operatively connected to transfer fuel into the tank, said transfer being discontinued when the desired fuel volume in the tank is reached, b. the fuel filling spout including a hermetic seal therein to prevent air from entering the tank when a filling hose is inserted into the filling spout and to prevent an inert pressurized gas within the tank from escaping as fuel is transferred into the tank, c. the inert gas exit line functioning to permit movement of said inert pressurized gas from a remote gas storage tank to a space within the fuel tank above a liquid fuel also located therein, the inert gas exit line including a gas transfer means located between the fuel tank and the gas storage tank, said transfer means operatively connected to move the gas bi-directionally between the fuel tank and the gas tank, and d. the pressure sensor being operatively connected to the gas transfer means to maintain the ullage at a desired pressure by transfer of the inert pressurized gas between the gas storage tank and the fuel tank.

2. The explosion proof fuel containment system of claim 1 wherein the inert gas pressurized gas is chosen from the group consisting of nitrogen, carbon dioxide, non-flammable halogenated hydrocarbons, sulfur hexaflouride and combinations thereof.

3. The explosion proof fuel containment system of claim 1 wherein the inert gas comprises 1% to 10% sulfur hexaflouride and 99% to 90% of a nonflammable gas chosen from the group consisting of nitrogen and carbon dioxide.

4. A method of preventing the ignition of a fuel while said fuel is held in a fuel storage tank comprising at all times maintaining a space within the tank above the fuel with an inert non-flammable gas supplied bidirectionally from a separate gas storage tank.

5. The method of claim 4 wherein the inert non-flammable gas is a mixture of inert non-flammable gases and at least one of the gases composing the mixture is an electronegative gas.

6. The method of claim 5 wherein the electronegative gas is sulfur hexaflouride.

7. The method of claim 4 wherein the inert non-flammable gas has as a component thereof an electronegative gas in an amount sufficient to prevent spark propagation.

8. The method of claim 7 wherein the electronegative gas is sulfur hexafluoride.

9. The method of claim 8 wherein the sulfur hexafluoride comprises from about 1% to about 10% of a mixture of non-flammable gases filling the space above the fuel.

10. The method of claim 7 wherein the inert non-flammable gas consists substantially only of sulfur hexafluoride.

11. The method of claim 7 wherein the inert non-flammable gas is substantially oxygen free.

* * * * *